C. B. KOSTERS.
SHOE TREE.
APPLICATION FILED FEB. 1, 1908.
947,387.
Patented Jan. 25, 1910.
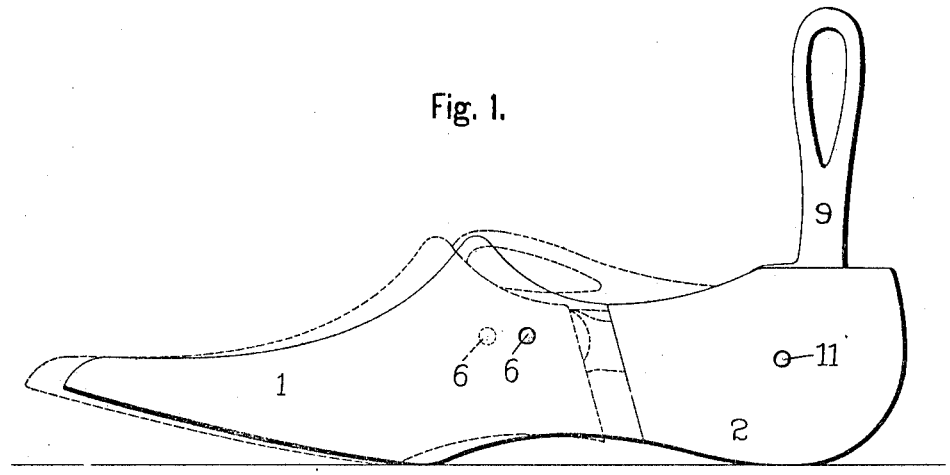
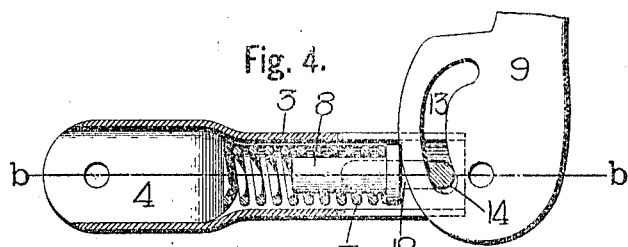
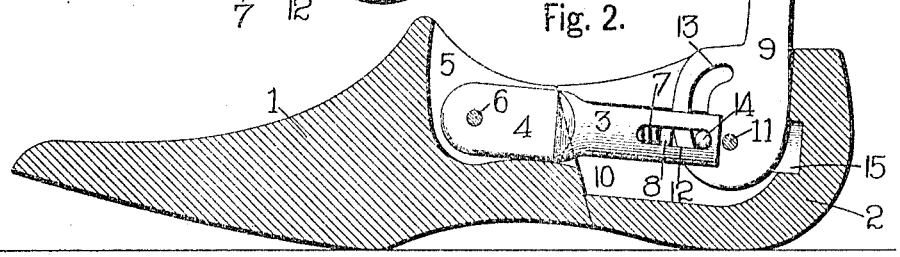
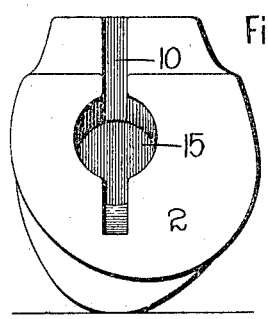
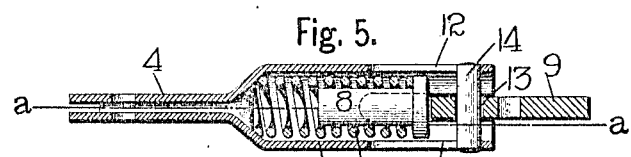
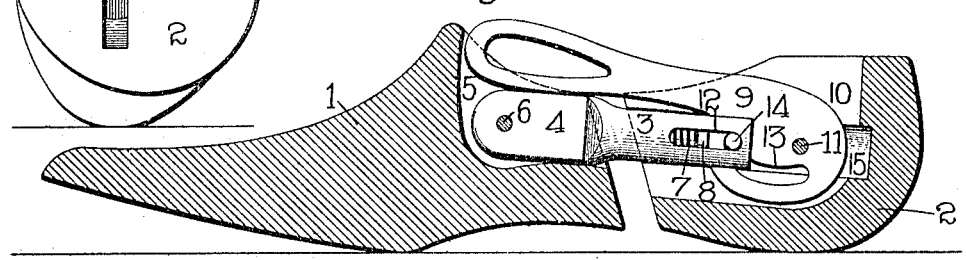
Witnesses.
Inventor.
Clements B. Kosters.

UNITED STATES PATENT OFFICE.

CLEMENTS B. KOSTERS, OF BUFFALO, NEW YORK.

SHOE-TREE.

947,387.  Specification of Letters Patent.  Patented Jan. 25, 1910.

Application filed February 1, 1908. Serial No. 413,775.

*To all whom it may concern:*

Be it known that I, CLEMENTS B. KOSTERS, a citizen of the United States, residing at Buffalo, in the county of Erie and State of New York, have invented a certain new and useful Improvement in Shoe-Trees, of which the following is a specification.

This invention relates to an improved tree or last for shoes and the object of the invention is to provide means whereby the tree or last is lengthened or shortened.

The invention also relates to certain details of construction which will be fully and clearly hereinafter described and claimed reference being had to the accompanying drawings, in which,—

Figure 1 is a side elevation of the improved shoe tree showing it in its normally closed position in full lines and in extended position in dotted lines. Fig. 2 is a central vertical longitudinal section through the shoe tree showing a side elevation of the cam lever and the connecting link, the tree being in its normally closed position. Fig. 3 is a view similar to Fig. 2 showing the shoe tree in extended position. Fig. 4 is a detached central longitudinal section through the connecting link on line *a a*, Fig. 5, the flanged pin and the cam being shown in elevation. Fig. 5 is a horizontal section through the cam and the connecting link on line *b, b*, Fig. 4, the flanged pin and the cam pin being shown in full. Fig. 6 is an enlarged detached front end elevation of the heel member of the improved shoe tree, showing the socket in which the cam lever and a portion of the connecting link are seated.

In referring to the drawings in detail like numerals designate like parts.

The improved tree or last consists of a plurality of members or parts which are connected so that they may move to lengthen or shorten the tree or last.

In the preferred construction shown in the accompanying drawings, the tree or last comprises a toe member 1, and a heel member 2 which are connected to each other by a cam device which affords means for lengthening or shortening the tree or last and also hinges them together so that one member may be turned up relatively to the other.

The connecting device is preferably formed as shown in Figs. 2, 3, 4 and 5, and comprises a tube 3 which is flattened at one end to form a comparatively thin flat section 4 which is inserted in a slot 5 in the toe member and pivoted therein by a pin 6, a spiral spring 7 located in the tube 3, a headed pin 8 having its stem fitted in the outer projecting end of the spring and a cam lever 9 having its cam edge bearing against the head of the pin 8 as shown in Fig. 4.

A comparatively deep slot 10 is cut in the heel member and the cam lever 9 is pivoted therein by a pin 11.

Means are provided for limiting the movement of the lever 9 and spring 7 and thereby limiting the separating movement of the two members of the tree or last. This means preferably consists in forming two parallel longitudinal slots 12 in the tube 3, and a cam slot 13 in the cam portion of the lever, and fitting a pin 14 which I term a cam pin through the slots 12 and cam slot 13 as shown in Figs. 2, 3, 4 and 5.

The heel member is provided with a circular longitudinal opening 15, see Fig. 6 in which the tube 3 extends as shown in Figs. 2 and 3.

The operation of this improved tree or last is as follows,—The device is first introduced into a shoe with the lever in the upright position shown in Fig. 2 and in full lines in Fig. 1, and the lever is therein moved in a forward direction into the substantially horizontal position shown in Fig. 3. This forces the headed pin 8 forward and compresses the spring 7 creating a spring tension tending to separate the heel and toe members. This causes the tree or last to automatically lengthen and fill the shoe.

The chief advantages of this improved tree or last resides in the yielding movement in which it expands itself within a shoe, and the convenient and quick way in which it may be shortened for insertion or removal.

I claim as my invention—

1. In a device of the class described, the combination with a toe member and a heel member, of means connecting the members; consisting of an element pivoted to the toe member, a cam pivoted to the heel member and adjustably connected to said element and a spring interposed between the element and the cam.

2. In a device of the class described, the combination with a toe member and a heel member, of a tubular element pivoted to the toe member, a cam lever pivoted to the heel member and having slotted connection with the tubular element and a spring interposed between the tubular element and the cam lever.

3. In a device of the class described, the combination with a toe member and a heel member, of a connecting means between said members, consisting of an element connected to the toe member, a cam connected to the heel member and a spring interposed between said element and the cam; said cam controlling the tension of the spring and said element and said cam having extensible and contractible connections.

4. In a device of the class described, the combination with a toe member and a heel member, of a connection between said members including an element pivoted to the toe member, a spring bearing against said element and a cam lever pivoted to the heel member and governing the tension of the spring.

5. In a device of the class described, the combination with a toe member and a heel member, of a connection between said members including a tube having a flattened end pivoted to the toe member, a spring in said tube and a cam lever pivoted to the heel member and bearing against the spring.

CLEMENTS B. KOSTERS.

Witnesses:
L. M. SANGSTER,
GEORGE A. NEUBAUER.